(12) United States Patent
Wakumoto et al.

(10) Patent No.: US 7,869,374 B2
(45) Date of Patent: Jan. 11, 2011

(54) SYSTEM AND METHOD FOR DETECTING A NETWORK LOOP

(75) Inventors: Shaun Wakumoto, Roseville, CA (US); Sankarlingam Dandabany, Rancho Cordova, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 313 days.

(21) Appl. No.: 12/151,177

(22) Filed: May 5, 2008

(65) Prior Publication Data

US 2009/0274054 A1    Nov. 5, 2009

(51) Int. Cl.
*G06F 11/00* (2006.01)
*H04L 12/28* (2006.01)
*H04M 3/08* (2006.01)

(52) U.S. Cl. .............. 370/242; 370/222; 370/389; 370/392; 709/238; 714/25; 379/35

(58) Field of Classification Search .............. 714/25, 714/712; 379/1.01, 35, 1.03, 4; 370/242, 370/241, 216, 406, 256, 258, 310–349, 389–400, 370/221–253; 709/238–243

See application file for complete search history.

(56) References Cited

U.S. PATENT DOCUMENTS

| 5,371,732 | A | 12/1994 | Brocken et al. |
| 5,889,847 | A | 3/1999 | Copley et al. |
| 7,159,032 | B2 | 1/2007 | Jim et al. |
| 2002/0049761 | A1 | 4/2002 | Trevor et al. |
| 2004/0054799 | A1* | 3/2004 | Meier et al. ............ 709/230 |
| 2004/0218539 | A1 | 11/2004 | Anqud et al. |
| 2007/0230357 | A1* | 10/2007 | Lin et al. ............ 370/241.1 |
| 2007/0298720 | A1* | 12/2007 | Wolman et al. ............ 455/66.1 |

* cited by examiner

*Primary Examiner*—Afsar M. Qureshi

(57) ABSTRACT

A system and methods of detecting a loop in a network having at least one access point with a first interface and a second interface, at least one switch with multiple ports, and at least one client with a first interface and a second interface, including: the access point first interface intermittently transmitting a loop check packet to the switch; the switch receiving the loop check packet at one of the ports and transmitting the loop check packet to the client through another one of the ports; the client first interface receiving the loop check packet; the client second interface retransmitting the loop check packet to the access point; and the access point second interface being configured to receive the retransmitted loop check packet. The access point detects a loop when the access point second interface receives the retransmitted loop check packet. Other embodiments eliminate the loops in various ways.

20 Claims, 6 Drawing Sheets

SYSTEM AND METHOD FOR DETECTING A NETWORK LOOP

BACKGROUND OF THE INVENTION

Many computers currently sold include a wired network card for connecting to a computer network using a cable and a wireless network card for connecting to a computer network wirelessly. Typically, a wired network card connects directly either to a modem or to a local area network (LAN) using a network cable. A wireless network card generally connects to a wireless LAN using a wireless protocol such as those defined by IEEE 802.11b/g/n.

Additionally, many modern operating systems enable network bridging, a feature that allows network cards within the same computer to communicate directly with one another so that all packets received on one network interface are transmitted on the second network interface. The prevalence of computers containing both wired and wireless network cards, together with the ease of enabling network bridging on the computers increases the potential for a user to inadvertently create a network loop.

A network loop is formed, for example, when a computer with network bridging enabled has a wired network card and a wireless network card connected to the same LAN. In this configuration, if a broadcast packet is sent to one of the computer's network cards, it will be forwarded to the other network card and sent to the network again. In this way, the broadcast packet can circulate around the network repeatedly, resulting in wasted bandwidth and potentially consuming CPU resources and delaying other network communications.

Currently known methods of detecting loops in a wired LAN include a spanning tree protocol, such as the protocol defined by IEEE 802.1D. However, computers with bridging enabled typically do not respond to packets sent out using spanning tree protocol, and not all access points support the spanning tree protocol. Thus, spanning tree protocol does not provide a comprehensive solution for identifying network loops caused by a device connecting to a network using both a wired and wireless interface.

DETAILED DESCRIPTION

Embodiments of the system and method of the present invention enable a network device such as an access point to detect a network loop formed when a computer is configured to bridge multiple network connections using both wired and wireless network technology. The access point is also able to take action to remove the network loop and restore the network to its original functionality. The systems advantageously require no extra resources from client computers that connect to the network. Moreover, no additional software is required for a personal computer to connect to the network. The following is a detailed description of certain embodiments of the invention presently contemplated by the inventors to be the best mode of carrying out the invention.

Figure 1:
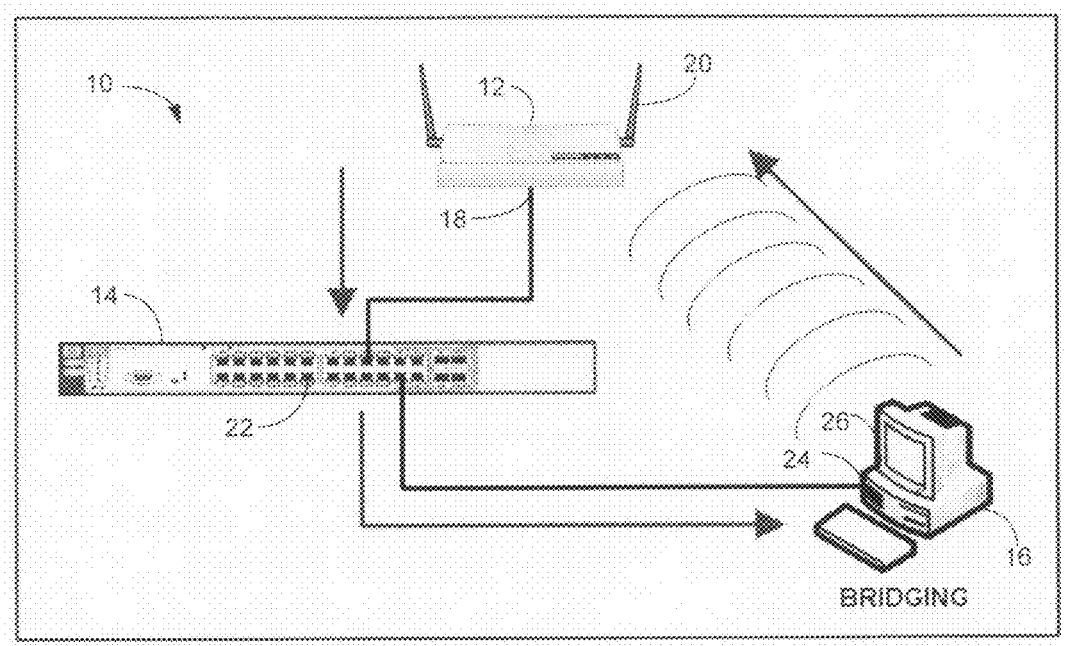
FIG. 1 is a network diagram showing a system capable of detecting a network loop according to an embodiment of the present invention.

Referring now to FIG. 1, a network is designated generally at 10, and includes network devices, such as an access point 12, a switch 14, and a client computer 16. The access point 12 is shown to have a wired interface 18 and a wireless interface 20. The interfaces 18, 20 allow various other network devices access to the network 10. The wired interface 18 has a connector that can be used to electrically connect the access point 12 and another network device using a network cable or the like. The wireless interface 20 has a device that can be used to send and receive communications from network devices that are within wireless signal range and have similar wireless interfaces.

The switch 14 has a plurality of ports 22, each of which can be used to connect a network device to the switch 14 using a network cable. The switch 14 can be used as a bridge to allow communication between connected network devices.

The client computer 16 has a wired network card 24 and a wireless network card 26. The wired network card 24 provides a wired interface for network communication, while the wireless network card 26 provides a wireless interface. In this embodiment, the client computer 16 is a personal computer, operating with the wired network card 24 and wireless network card 26 in bridging mode.

The wired interface 18 of the access point 12 is connected to one of the ports 22 of the switch 14 by a wired connection. Similarly, another one of the ports 22 of the switch 14 is connected to the wired network card 24 of the client computer 16, connecting the various network devices to form a simple network. A loop is formed in the illustrated network when the wireless interface 20 of the access point 12 is connected to the wireless network card 26 of the client computer 16.

Figure 2:
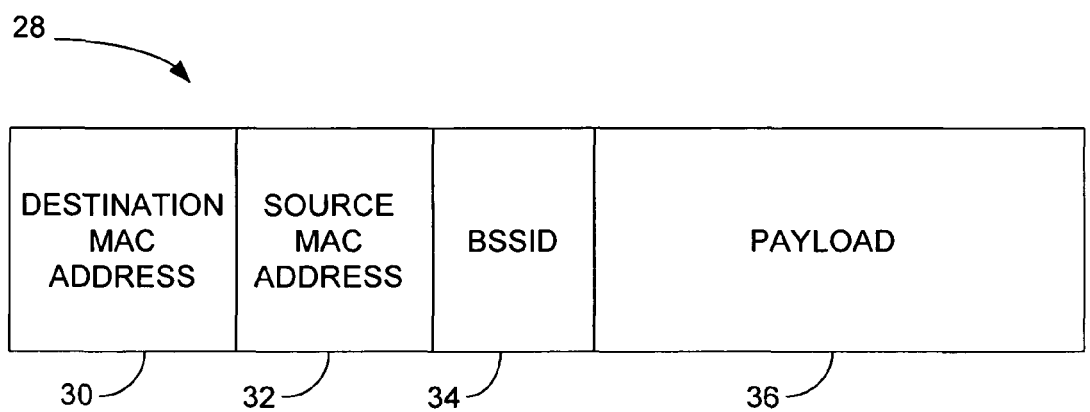
FIG. 2 is a diagram illustrating the form of a loop check packet for use with the system shown in FIG. 1.

The access point 12 can detect a loop formed from both wired and wireless network connections by use of embodiments of the system and method that utilize a loop check packet 28. As shown in FIG. 2, the loop check packet 28 is a layer 2 multicast packet that includes fields for at least a destination media access control (MAC) address 30, a source MAC address 32, a basic service set identifier (BSSID) 34, and a packet payload 36. The destination MAC address 30 indicates a device or devices the packet 28 should be transmitted to. The source MAC address 32 and BSSID 34 both indicate the network device that originally transmitted the loop check packet 28. The packet payload 36 can contain data to be transmitted to one or more network devices, or the payload can be used for other purposes.

Figure 3:
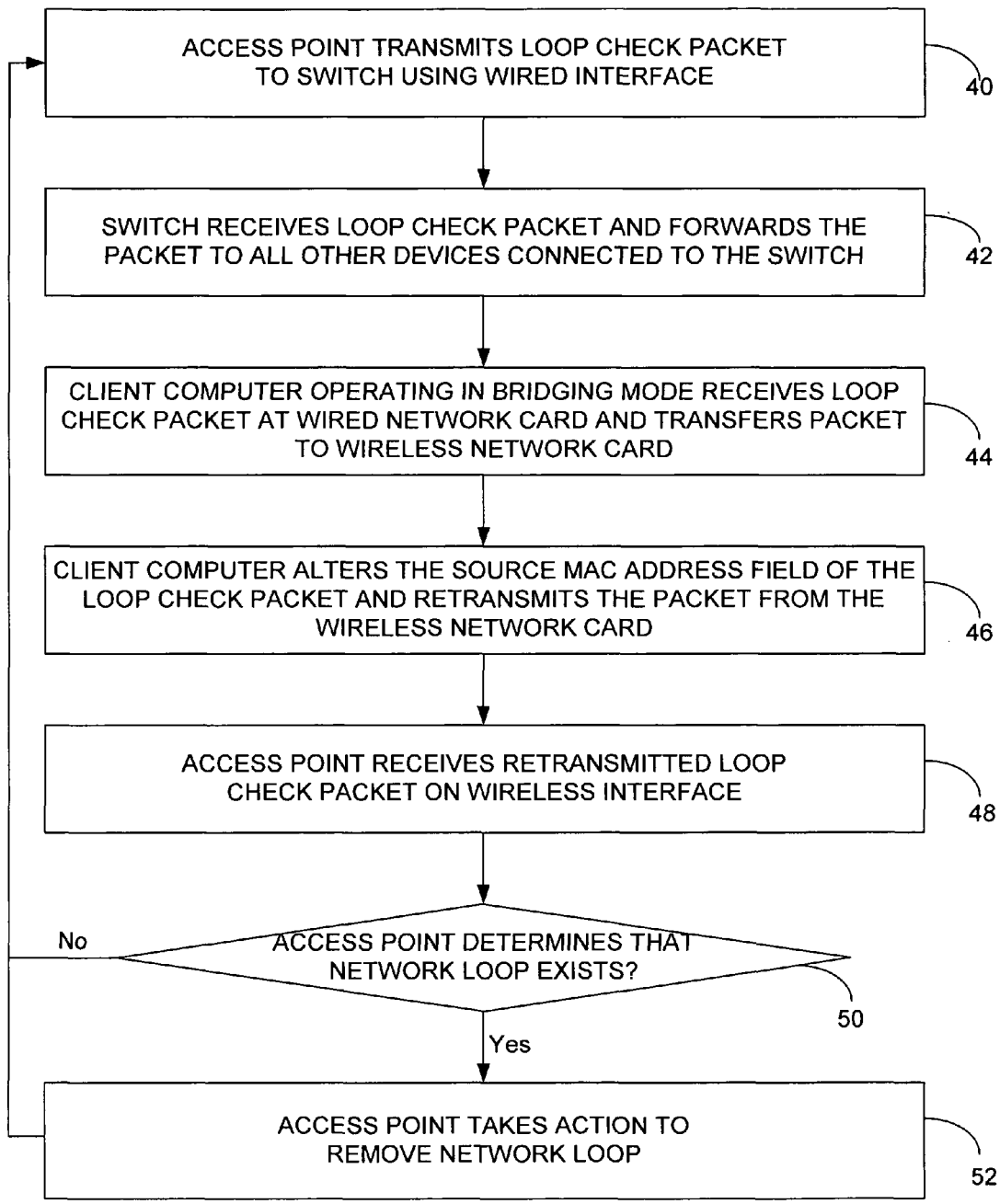
FIG. 3 is a flowchart showing a preferred embodiment of a method of detecting a network loop using the system shown in FIG. 1.

Referring now to FIG. 3, an embodiment of a method of detecting a network loop using the loop check packet 28 is described. In step 40, a processor within the access point 12 directs the access point to transmit the loop check packet 28 as a layer 2 packet, filling in the destination MAC address field 30 with a multicast address, and entering the MAC address of the access point 12 into the source MAC address field 32 and the BSSID field 34. The loop check packet 28 is sent from the access point wired interface 18 to the switch 14.

Next, in step 42, the switch 14 receives the loop check packet 28 sent by the access point 12 at one of the switch ports 22. Because the loop check packet 28 is designated as a multicast packet, the switch 14 transmits the loop check packet to devices connected to any of the ports 22 of the switch except the receiving port. Thus, all devices connected to the network 10 through a wired connection will receive the loop check packet 28. In the network shown in FIG. 1, the only additional device connected to the switch 14 is the client computer 16. Accordingly, the switch 14 will transmit the loop check packet 28 to the wired network card 24 of the client computer 16.

In step 44, the client computer 16 receives the loop check packet 28 at the wired network card 24. Because the client computer 16 is operating in bridging mode, the loop check packet 28 will be sent from the wired network card 24 to the wireless network card 26.

In step 46, the client computer 16 changes the source MAC address field 32 in the loop check packet so that it contains the MAC address of the client computer wireless network card 26, and transmits the loop check packet 28 from the wireless network card to the destination MAC address (i.e., the multicast MAC address). In this case, the client computer 16 will transmit the loop check packet 28 to the access point 12 via wireless connection.

In step 48, the access point 12 will receive the retransmitted loop check packet 28 at the wireless interface 20. In step 50, the access point processor determines whether the received packet is a copy of the loop check packet that that access point originally transmitted. If the received packet is not a copy of the original loop check packet, processing continues normally. Otherwise, because the access point 12 received the copy of the loop check packet 28 on an interface different from the one the loop check packet was originally transmitted on, the processor included within the access point 12 is able to detect that a loop exists in the network.

Once the access point 12 determines that a network loop exists, the access point preferably takes remedial action to break the loop in step 52. For example, the access point 12 can break the network loop by blocking all communication received by the wireless interface 20. Alternatively, the access point 12 can extract the data from the source MAC address field 30 from the received loop check packet 28. The value contained in the source MAC address field 30 provides the access point 12 with the MAC address of the network device that caused the network loop. Accordingly, the access point 12 can block incoming traffic that originates from the MAC address contained in the source MAC address field 30 to break the network loop with minimal interruption of service to other network devices.

Additional client computers may connect to the network at any time. For this reason, it is important that the access point monitor the network 10 for network loops relatively often. For that reason, the access point 12 can be configured to transmit a new loop check packet periodically. It is contemplated that the default period of time between transmitting loop check packets is within a range of about 5 seconds to about 30 seconds, but the delay can be modified by a user to accommodate networks of various sizes and with various amounts of network traffic.

Figure 4:
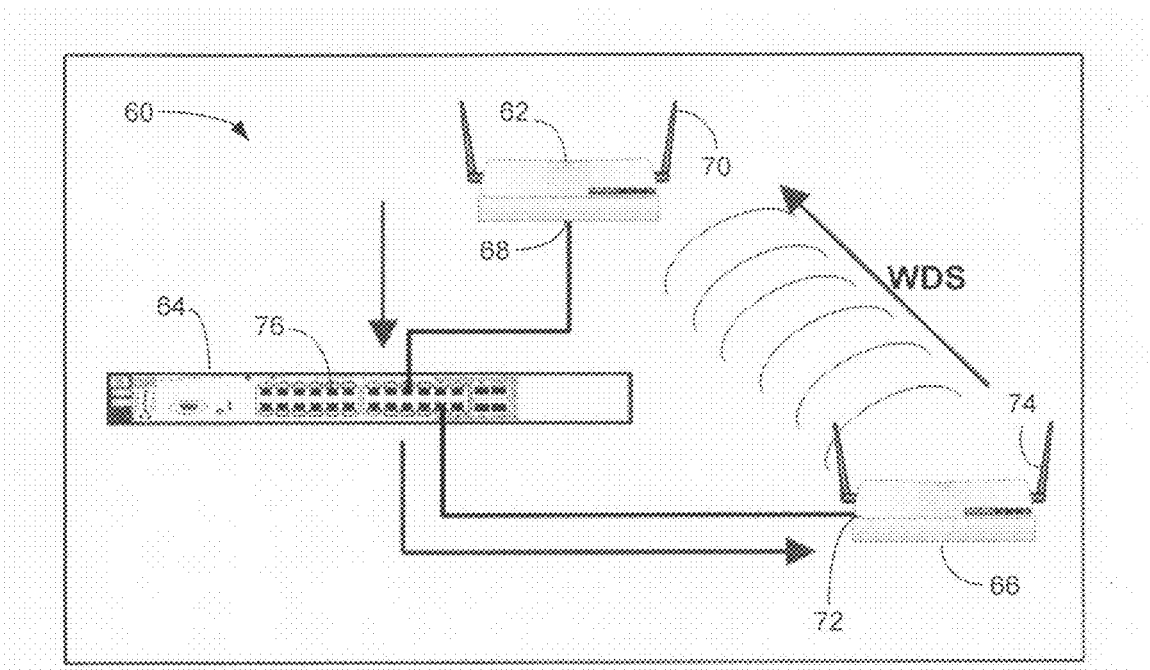
FIG. 4 is a network diagram showing a preferred embodiment of a system capable of detecting a network loop in a wireless distribution system network.

It is also possible to find wireless loops in a wireless distribution service (WDS) network with multiple access points using a similar technique. FIG. 4 shows a WDS network 60 including a first access point 62, a switch 64, and a second access point 66.

The first access point 62 has a wired interface 68 and a wireless interface 70 for communicating with other network devices on the local area network. Similarly, the second access point 66 has a wired interface 72 and a wireless interface 74. The switch 64 has a plurality of ports 76, each port capable of connecting a network device to the switch 64. The switch 64 acts as a bridge to allow communication between connected network devices.

The wired interface 68 of the first access point 62 is connected to one of the ports 76 of the switch 64. Another of the ports 76 of the switch 64 is connected to the wired interface 72 of the second access point 66. A loop is formed when the wireless interface 70 of the first access point 62 is connected with the wireless interface 74 of the second access point 66 via a WDS link.

Figure 5A:
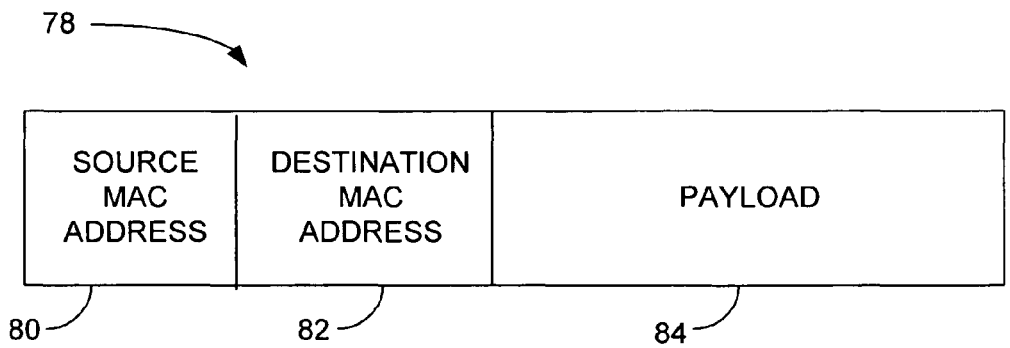
FIG. 5A is a diagram illustrating a form of a loop check packet for use with the system shown in FIG. 4.

The first access point 62 uses a loop check packet 78 to detect a loop in the WDS network 60. As seen in FIG. 5A, the loop check packet 78 is a special layer 2 multicast packet that includes fields that contain at least a source MAC address 80, a destination MAC address 82, and a packet payload 84. The source MAC address field 80 contains the address of the device that transmits the packet. The destination MAC address 82 indicates what device or devices the packet should be sent to.

The first access point 62 transmits a new loop check packet periodically to ensure that the WDS network 60 remains free of loops. It is contemplated that the default length of time between transmitted loop check packets would be within the range of about 5 seconds to about 30 seconds, but the period is user-configurable, to allow for variation in network size and varying traffic levels.

Figure 6:
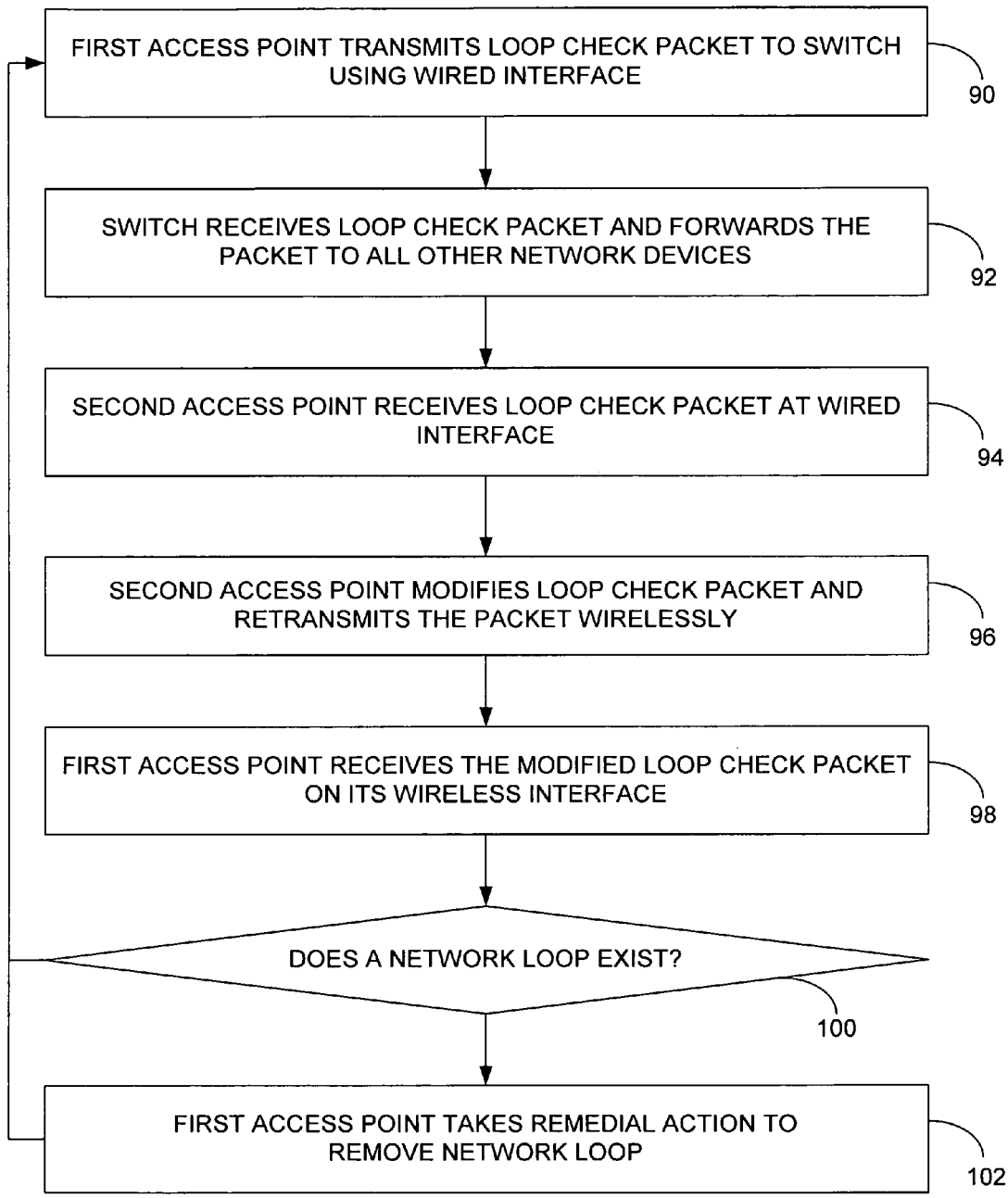
FIG. 6 is a flowchart showing another embodiment of a method of detecting a network loop using the system shown in FIG. 4.

Referring now to FIG. 6, a method of detecting a loop in a WDS network is described. In step 90, the first access point 62 transmits the loop check packet 78 from the first access point wired interface 68 to the switch 64.

In step 92, the switch 64 receives the packet 78 at one of the ports 76. The switch 64 then forwards the loop check packet 78 from all ports other than the receiving port, to all connected devices. In the network shown in FIG. 4, the switch 64 forwards the packet to the second access point 66 because the second access point is the only other connected device.

Figure 5B:
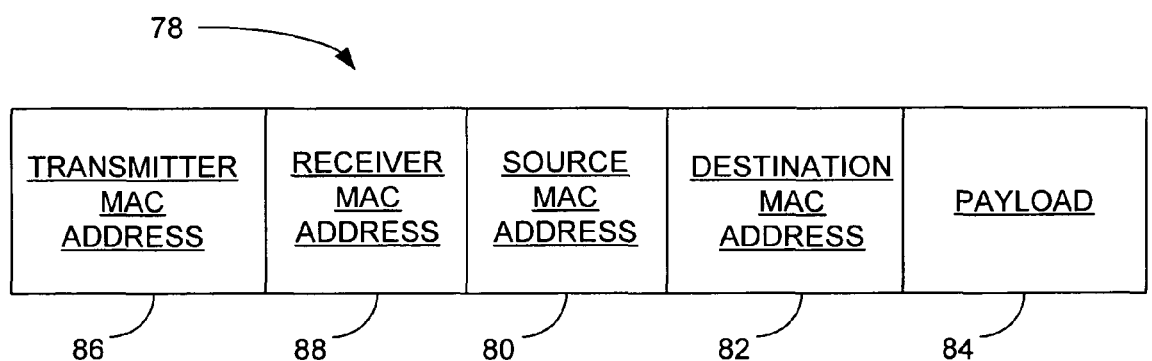
FIG. 5B is a diagram illustrating a modification of the loop check packet of FIG. 5A.

The second access point 66 receives the loop check packet 78 on its wired interface 72 at step 94. Then in step 96, the second access point 66 adds two fields to the loop check packet 78: a transmitter MAC address field 86 and a receiver MAC address field 88. The modified loop check packet is shown in FIG. 5B. The transmitter MAC address field 86 is populated with the MAC address corresponding to the second access point 66 (i.e., the device transmitting the packet over the WDS link). The receiver MAC address field 88 is populated with the MAC address that the transmitter is transmitting to (in this case, the first access point 62). The second access point 66 then transmits the modified loop check packet 78 through its WDS link to the first access point 62.

At step 98, the first access point 62 receives the loop check packet 78 at its wireless interface 70. In step 100, a processor included within the first access point 62 determines whether the received packet is the loop check packet that was originally transmitted by the first access point. If it is, processing continues to step 102. Otherwise, processing returns to step 90. In this example, because the modified loop check packet 78 was based on the loop check packet originally transmitted by the first access point, and it was received on a different interface than it was originally transmitted on, the first access point 62 detects that a loop exists within the WDS network 60.

In step 102, the first access point 62 takes remedial action to remove the loop. The first access point 62 first extracts information in the transmitter MAC address field 86 of the loop check packet 78. This field contains the MAC address corresponding to the access point in the WDS network 60 that created the loop (in this case, the second access point 66). Then, the first access point 62 disables the WDS link with the access point that created the loop. In this case, the WDS link between the first access point 62 and the second access point 66 would be disabled. The disabling of this WDS link will remove the loop from the WDS network 60.

While particular embodiments of the invention have been described herein, it will be appreciated by those skilled in the art that changes and modifications may be made without departing from the invention in its broader aspects as set forth in the following claims.

What is claimed is:

1. A method of detecting a loop in a network having at least one access point with a first interface and a second interface, at least one switch with a plurality of ports, and at least one client with a first interface and a second interface, comprising:
   the access point first interface intermittently transmitting a loop check packet to the switch;
   the switch receiving said loop check packet at one of the plurality of ports;
   the switch transmitting said loop check packet to said client through another one of the plurality of ports;
   the client first interface receiving said loop check packet transmitted by the switch;
   the client second interface retransmitting said loop check packet to the access point;
   the access point second interface receiving said retransmitted loop check packet; and
   the access point detecting a loop based on receipt of said retransmitted loop check packet by said access point second interface.

2. The method of claim 1, further comprising said client embedding its own address information into the retransmitted loop check packet.

3. The method of claim 2, further comprising, when a loop is detected, said access point reading said embedded address information from said retransmitted loop check packet and blocking traffic originating from said embedded address received by said second interface of said access point.

4. The method of claim 1, wherein when a loop is detected said access point blocks all traffic received by said second interface of said access point.

5. The method of claim 1, wherein said loop check packet is a layer 2 multicast packet.

6. The method of claim 1, wherein the access point first interface transmits said loop check packet periodically.

7. The method of claim 6, wherein the access point first interface periodically transmits said loop check packet with period that is within the range of approximately 5 seconds to approximately 30 seconds.

8. A loop detecting system, comprising:
   at least one access point having a wired interface and a wireless interface;
   at least one switch having a plurality of ports;
   at least one client having a wired interface and a wireless interface;
   said access point wired interface configured to transmit a loop check packet to said switch and said access point wireless interface configured to receive data;
   said switch configured to receive said loop check packet at one of said plurality of ports and to transmit said loop check packet to said client through another one of said plurality of ports;
   said client configured to receive said loop check packet transmitted by the switch at said client wired interface and to retransmit said loop check packet from said client wireless interface to said access point,
   wherein said access point detects a loop based on receipt of said retransmitted loop check packet by said access point wireless interface.

9. The system of claim 8, wherein said client embeds its own address information into the retransmitted loop check packet.

10. The system of claim 9, wherein, when a loop is detected, said access point reads said embedded address information from said retransmitted loop check packet and blocks traffic originating from said embedded address received by said second interface of said access point.

11. The system of claim 9, wherein said address information comprises a Media Access Control (MAC) address.

12. The system of claim 8, wherein when a loop is detected said access point blocks all traffic received by said second interface of said access point.

13. The system of claim 8, wherein said loop check packet is a layer 2 multicast packet.

14. The system of claim 8, wherein said client is a computer with network bridging enabled.

15. The system of claim 8, wherein said client is another access point.

16. An access point comprising:
   a wired interface;
   a wireless interface;
   a processor;
   said processor causing the access point to transmit a loop check packet from said wired interface to any device that is connected to said wired interface; and
   said processor determining whether or not a retransmitted loop check packet is received on said wireless interface;
   wherein said processor detects that a network loop exists when said processor determines that said retransmitted loop check packet is received on said wireless interface.

17. The access point of claim 16, wherein, when said processor detects said network loop, said processor blocks all communication received by said wireless interface.

18. The access point of claim 16, wherein, when said processor detects said network loop, said processor extracts address information from said retransmitted loop check packet.

19. The access point of claim 18, wherein said processor blocks communication originating from an address corresponding to said extracted address information.

20. The access point of claim 16, wherein said loop check packet is a layer 2 multicast packet.

* * * * *